United States Patent
Eng

[19]

[11] Patent Number: 6,101,104
[45] Date of Patent: Aug. 8, 2000

[54] PREDICTIVE THRESHOLD SYNCHRONOUS RECTIFIER CONTROL

[75] Inventor: John E. Eng, Buena Park, Calif.

[73] Assignee: Hughes Electronics Corporation, Los Angeles, Calif.

[21] Appl. No.: 09/090,728

[22] Filed: Jun. 4, 1998

[51] Int. Cl.[7] .................................................. H02M 7/217
[52] U.S. Cl. ............................ 363/21; 363/89; 363/127
[58] Field of Search ................................ 363/21, 89, 127

[56] References Cited

U.S. PATENT DOCUMENTS

| | | | |
|---|---|---|---|
| 4,870,555 | 9/1989 | White | 363/127 |
| 4,922,404 | 5/1990 | Lugwig et al. | 363/89 |
| 4,953,068 | 8/1990 | Henze | 363/127 |
| 5,144,547 | 9/1992 | Masamoto | 363/127 |
| 5,430,640 | 7/1995 | Lee | 363/127 |
| 5,528,480 | 6/1996 | Kikinis et al. | 363/89 |
| 5,734,563 | 3/1998 | Shinada | 363/21 |
| 5,742,491 | 4/1998 | Bowman et al. | 363/21 |
| 5,774,350 | 6/1998 | Notaro et al. | 363/89 |
| 5,818,704 | 10/1998 | Martinez | 363/21 |
| 5,841,641 | 11/1998 | Faulk | 363/21 |
| 5,870,299 | 2/1999 | Rozman | 363/127 |

*Primary Examiner*—Jeffrey Sterrett
*Attorney, Agent, or Firm*—Terje Gudmestad; Georgann Grunebach; Michael W. Sales

[57] ABSTRACT

A method and apparatus are disclosed for controlling the operation of a synchronous rectifier used in power conversion circuitry. The disclosed method and apparatus senses the voltage across the synchronous rectifier, and turns the synchronous rectifier OFF when the voltage across the rectifier is about to change direction. Preferably, the synchronous rectifier is commanded OFF at the approximate instant when the voltage across the rectifier reaches approximately zero, which also corresponds to a current of approximately zero. Accordingly, currents are prevented from flowing in the reverse direction in the synchronous rectifier. This results in approximately zero voltage and zero current switching when the rectifier is turned OFF, thereby minimizing switching losses.

12 Claims, 4 Drawing Sheets

PREDICTIVE THRESHOLD SYNCHRONOUS RECTIFIER CONTROL

BACKGROUND OF THE INVENTION (a) Field of the Invention

The present invention relates in general to preventing reverse current flow in switching power supplies. More particularly, it relates to an improved control circuit and method for preventing reverse current flow in synchronous rectifiers used in switching power supplies.

(b) Description of Related Art

Power supplies are used in many industrial and aerospace applications, and also in consumer products. Some of the requirements of power supplies are small size, light weight, low cost, and high power conversion efficiency. Some power supplies also require electrical isolation between the source and the load, low harmonic distortion for the input and output waveforms, and high power factor if the source is ac voltage.

DC power can be generated directly from a dc source, or converted from an ac source. If an ac source is used, then an ac-to-dc converter must be provided. In these converters, electrical isolation can only be provided by relatively bulky line frequency transformers. The ac source can be rectified (i.e., converted to dc) to generate uncontrolled dc, then a dc-to-dc converter can be used to convert the uncontrolled dc to a controlled dc output. Electrical isolation between the input source and the output source in the dc-to-dc converter is achieved by using a high-frequency (HF) transformer. HF transformers have small size, light weight, and low cost compared to bulky line frequency transformers.

Switching power supplies use power semiconductor switches that can be commanded to ON and OFF switching states to control the power into their associated power conversion elements, resulting in high efficiency, small size, and light weight. With the availability of fast switching devices, HF magnetics and capacitors, and high-speed control ICs, switching power supplies have become very popular. A particularly advantageous switching power supply uses pulse width-modulated (PWM) converters to convert an alternating voltage of variable amplitude and frequency to a variable dc voltage. These converters employ square-wave pulse width modulation to achieve voltage regulation. The average output voltage is varied by varying the duty cycle of the power semiconductor switch. The voltage waveform across the switch and at the output are square wave in nature, and they generally result in higher switching losses when the switching frequency is increased. Also the switching stresses are high with the generation of large electromagnetic interference (EMI), which is difficult to filter. However, these converters are easy to control, well understood, and have wide load control range.

Diode rectifiers are often used as the main rectifying (or power-conversion) element of a switching power supply. So-called "synchronous" rectifiers, most commonly silicon MOSFETs, are often used in switching power supplies to achieve greater power conversion efficiencies than are available from diode rectifiers. In general, synchronous rectifiers can be commanded, via control circuitry, to conduct significant current in both directions, while diodes are only capable of conducting significant current in one direction.

Typically, the control circuitry for a synchronous rectifier switches the rectifier ON when the power supply main switch is switched OFF, and the rectifier control circuitry employs various methods to prevent both the rectifier and the power supply main switch from being ON at the same time. However, in some applications, for example, where the power supply inductor is operating in a discontinuous conduction mode or where multiple power conversion modules are wired in parallel for redundancy and/or current sharing, the synchronous rectifier remaining ON when the output current of the converter reverses direction causes undesirable reverse current flows. There is, accordingly, a need for a rectifier control circuit and method that prevents undesirable reverse current flows in synchronous rectifiers.

SUMMARY OF THE INVENTION

The present invention addresses the shortcomings of known power converters by providing a synchronous rectifier control circuit and method that prevents undesirable reverse current flows by controlling the synchronous rectifier to behave like a diode rectifier under selected conditions. Typically, these conditions include when the voltage across the rectifier reverses direction. In particular, the present invention provides a control method and apparatus that senses the voltage across the synchronous rectifier, and turns the synchronous rectifier OFF when the voltage across the rectifier is about to change direction. Preferably, the synchronous rectifier is commanded OFF at the approximate instant that the voltage across the rectifier reaches approximately zero, which also corresponds to a current of approximately zero. Therefore, the present invention prevents currents from flowing in the reverse direction in the synchronous rectifier and provides for zero voltage and zero current switching when the rectifier is turned OFF, thereby minimizing switching losses.

Accordingly, the present invention may be embodied in an apparatus comprising a rectifier and a rectifier control circuit that controls said rectifier based on sensing a voltage across the rectifier. The rectifier is capable of conducting current in more than one direction when the rectifier is ON, and the rectifier control circuit turns the rectifier OFF when the rectifier voltage reaches a predetermined value. The predetermined value may be set at approximately zero which corresponds to approximately zero current through said rectifier.

The present invention may also be embodied in an apparatus comprising a power source and a power converter that receives power from the power source in a first format and converts the received power to a second format. The power converter comprises a main switch, a rectifier, a main controller and a rectifier controller. The main switch controls the received power into the converter. The rectifier can conduct current in more than one direction when the rectifier is commanded ON, and conducts approximately zero current when the rectifier is commanded OFF. The main controller controls the main switch and the rectifier by turning the main switch OFF and turning the rectifier ON when the received and converted power exceeds a first predetermined value, and by turning the main switch ON and the rectifier OFF when the received and converted power falls below a second predetermined value. The rectifier controller also controls the rectifier and turns the rectifier OFF when the voltage across the rectifier exceeds a third predetermined value.

Preferably, the above-described rectifier controller senses the voltage across the rectifier. The third predetermined value may be set at approximately zero, and the point at which the voltage across the rectifier exceeds the third predetermined value of approximately zero corresponds to approximately zero current through the rectifier. The above-described apparatus may also be provided with a plurality of the power converters connected in parallel for redundancy. Also, the power supply and the plurality of power converters could be housed in a satellite.

The present invention may also be embodied in a method comprising the steps of sensing a voltage across a rectifier, and using the sensed voltage to control the operation of the rectifier. The step of controlling the operation of the rectifier comprises commanding the rectifier OFF when the sensed voltage exceeds a predetermined value. The rectifier is capable of conducting current in more than one direction when the rectifier is ON. The predetermined value can be set at approximately zero, and the approximately zero voltage across the rectifier corresponds to approximately zero current through said rectifier.

The present invention may be further embodied in a method comprising the steps of controlling a main switch and a power converter, whereby the main switch controls the power received at the power converter, and the power converter includes a rectifier that conducts current in more than one direction when the rectifier is commanded ON and conducts approximately zero current when the rectifier is commanded OFF. The step of controlling the main switch and the rectifier comprising turning the main switch OFF and turning the rectifier ON when the received and converted power exceeds a first predetermined value, and further comprising turning the main switch ON and the rectifier OFF when the received and converted power falls below a second predetermined value. The step of controlling the rectifier further comprises turning the rectifier OFF when the voltage across the rectifier exceeds a third predetermined value. The step of controlling the rectifier controller can further comprise sensing the voltage across the rectifier. The third predetermined value may be set at approximately zero, and the point at which the voltage across the rectifier exceeds the third predetermined value of approximately zero corresponds to approximately zero current through the rectifier. A plurality of the power converters may be provided and connected in parallel for redundancy.

The invention itself, together with further objects and attendant advantages, will best be understood by reference to the following detailed description, taken in conjunction with the accompanying drawings.

BRIEF DESCRIPTION OF THE DRAWINGS

FIG. 3b illustrates a selected portion of the ON/OFF characteristic for Q3 corresponding to the current characteristic shown in FIG. 3a.

FIG. 3c illustrates a selected portion of the voltage characteristic for Q3 corresponding to the current characteristic shown in FIG. 3a.

FIG. 3d illustrates a selected portion of the output characteristic of the logic element U4 shown in FIG. 2 and corresponding to the current characteristic shown in FIG. 3a.

DESCRIPTION OF THE PREFERRED EMBODIMENTS

By way of example only, the method and apparatus of the present invention will be described below in connection with a particular example that uses a pulse width modulation controlled forward converter in a satellite power supply having redundancy and current sharing features. However, the control circuitry of the present invention has application to a wide variety of power converter topologies and applications beyond the particular examples disclosed herein.

Figure 1:
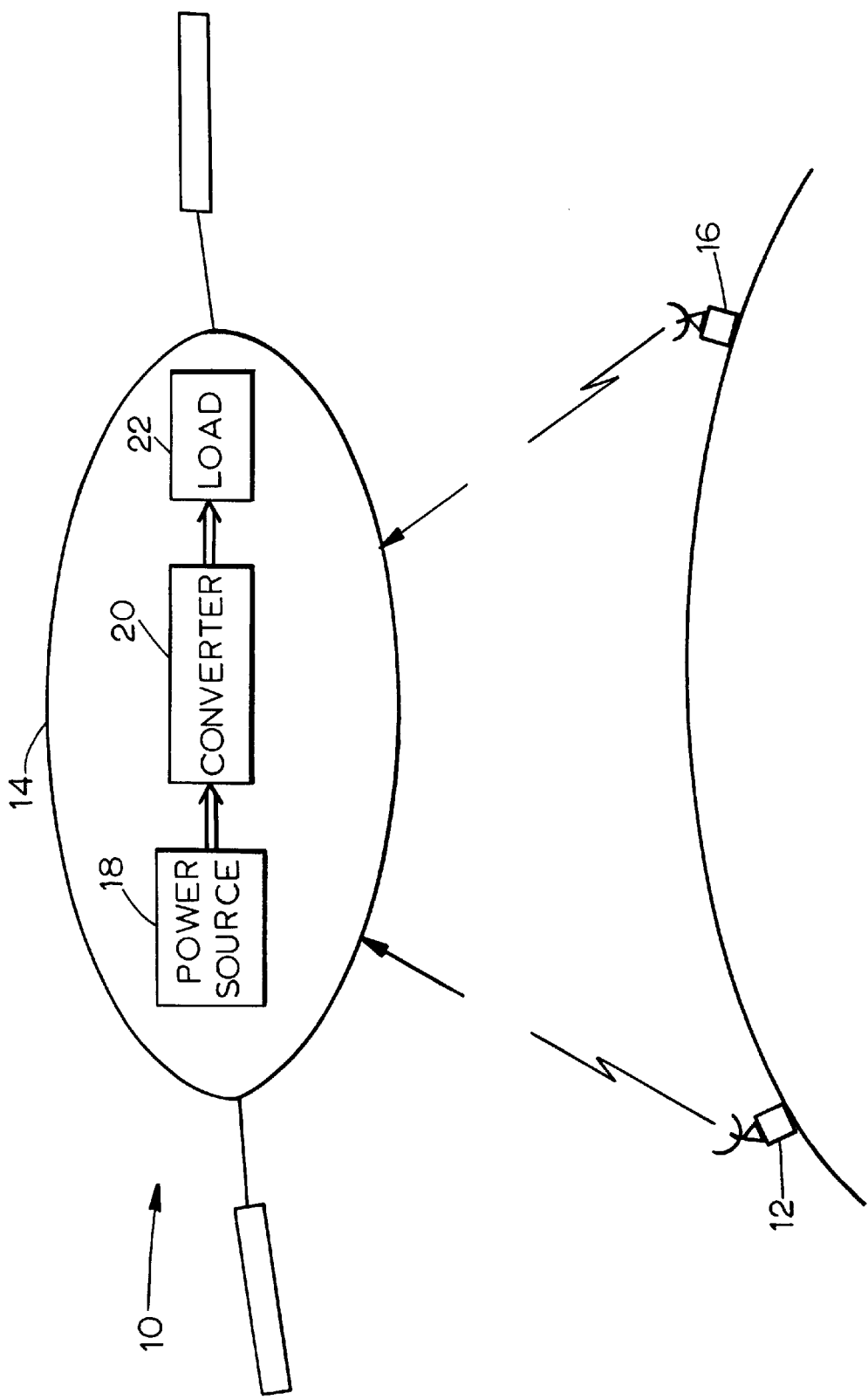
FIG. 1 is a diagram illustrating a satellite that uses the power converter and control circuit and method of the present invention.

FIG. 1 illustrates a satellite-based communication system 10 embodying the present invention. The system 10 includes generally a first ground-based communication link 12, a satellite relay 14 and a second ground-based communication link 16. The system 10 represents a wide variety of communications systems that utilize some form of ground to satellite to ground communication path. Exemplary systems include voice-based telephony, data communications, video/entertainment communications, and others.

The satellite 14 will include a variety of electrical components that call for ac and/or dc power. This is represented diagrammatically in FIG. 1 by the power source (or supply) 18, a converter 20 and a load 22. If the load 22 calls for dc power, dc power can be generated directly from a dc source, or converted from an ac source. If the power supply 18 is an ac source, then the converter 20 provides overall ac-to-dc conversion. The power converter 20 rectifies (i.e., converts to dc) the ac from the power supply 18 to generate uncontrolled dc, then converts the uncontrolled dc to a controlled dc output. Electrical isolation between the input source and the output source at the dc-to-dc stage of the converter 20 can be achieved by using a high-frequency (HF) transformer. HF transformers have small size, light weight, and low cost compared to bulky line frequency transformers.

The converter 20 preferably uses power semiconductor switches that can be commanded to ON and OFF switching states to control the power into their associated power conversion elements, resulting in high efficiency, small size, and light weight. With the availability of fast switching devices, HF magnetics and capacitors, and high-speed control ICs, switching power supplies have become very popular. A particularly advantageous switching power supply uses pulse width-modulated (PWM) converters to convert an alternating voltage of variable amplitude and frequency to a variable dc voltage. These converters employ square-wave pulse width modulation to achieve voltage regulation. The average output voltage is varied by varying the duty cycle of the power semiconductor switch. The voltage waveform across the switch and at the output are square wave in nature, and they generally result in higher switching losses when the switching frequency is increased. Also the switching stresses are high with the generation of large electromagnetic interference (EMI), which is difficult to filter. However, these converters are easy to control, well understood, and have wide load control range.

So-called "synchronous" rectifiers, most commonly silicon MOSFETs, are used as the main rectifying (or power conversion) element of the power converter 20 to achieve greater power conversion efficiencies than are available from diode rectifiers. In general, synchronous rectifiers can be commanded, via control circuitry, to conduct significant current in both directions, while diodes are only capable of conducting significant current in one direction.

Typically, the control circuitry for a synchronous rectifier switches the rectifier ON when the power supply main switch (which is in series with the power source 18) is switched OFF, and the rectifier control circuitry employs various methods (e.g., U.S. Pat. No. 5,479,089, incorporated herein by reference) to prevent both the rectifier and the power supply main switch 18 from being ON at the same time. However, in some applications, for example, where the power converter 20 includes multiple power conversion modules wired in parallel for redundancy and/or current sharing, the two-direction conductivity of the synchronous rectifier(s) of the power converter 20 can cause undesirable reverse current flows when the output current of the power converter 20 reverses direction or when the voltage across the synchronous rectifier reverses direction.

The present invention provides in the power converter 20 a rectifier control circuit and method that prevents undesirable reverse current flows in synchronous rectifiers. In particular, the present invention prevents undesirable reverse current flows by controlling the synchronous rectifier to behave like a diode rectifier under selected conditions. Typically, these conditions include when the output current of the power converter 20 reverses direction. In particular, the present invention provides a control method and apparatus that senses the voltage across the synchronous rectifier, and turns the synchronous rectifier OFF when the voltage across the rectifier is about to change direction. Preferably, the synchronous rectifier is commanded OFF at the approximate instant that the voltage across the rectifier reaches approximately zero, which also corresponds to a current of approximately zero. Therefore, the present invention prevents currents from flowing in the reverse direction in the synchronous rectifier and provides for zero voltage and zero current switching when the rectifier is turned OFF, thereby minimizing switching losses.

Figure 2:
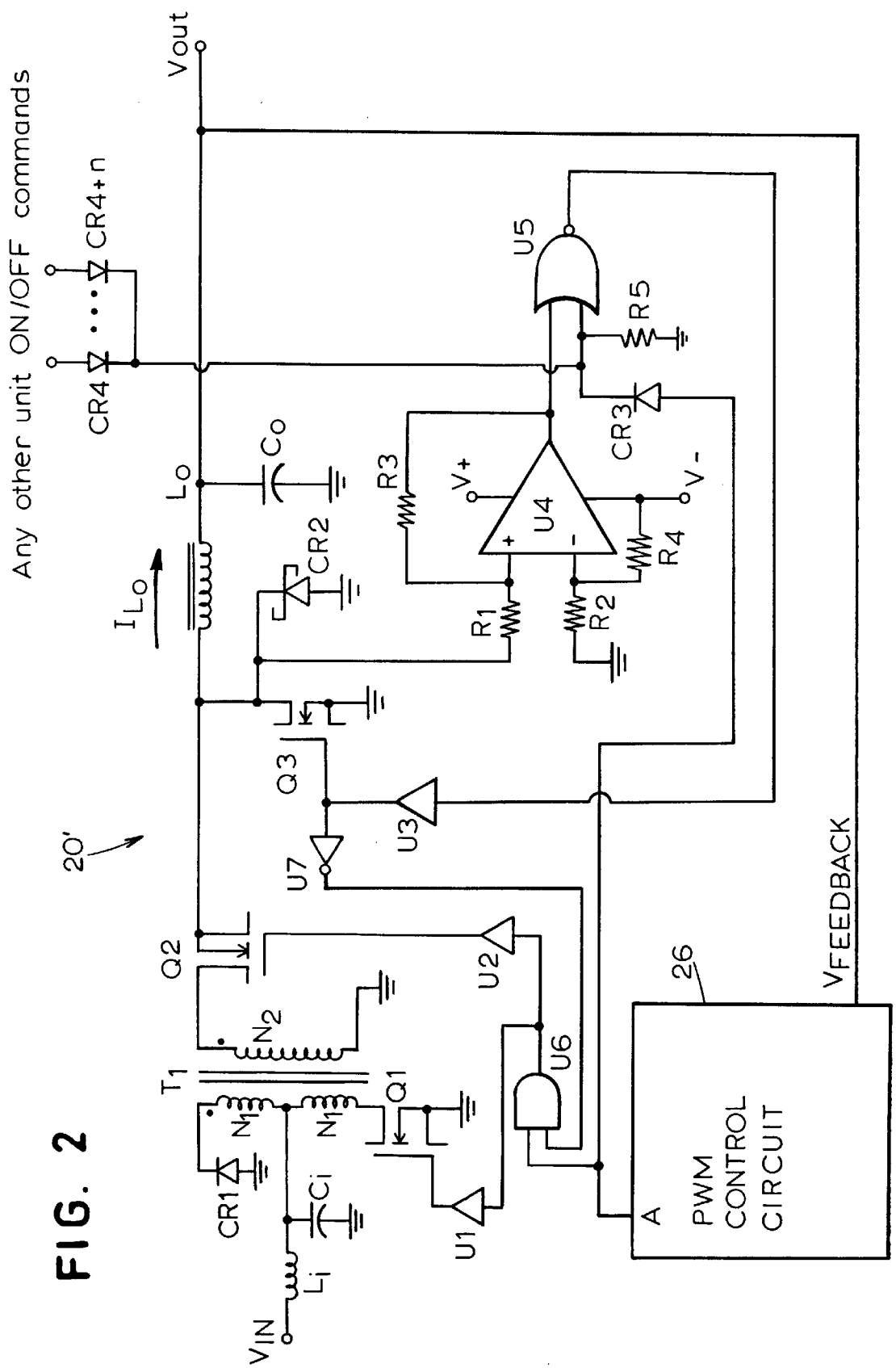
FIG. 2 is a more detailed diagram of the power converter and control circuit shown in FIG. 1.
Figure 3A:
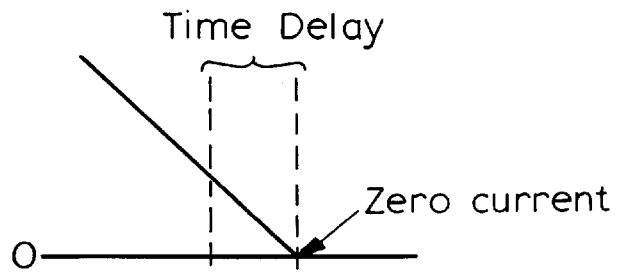
FIG. 3a illustrates a selected portion of the current characteristic for the synchronous rectifier switch Q3 shown in FIG. 2.
Figure 3B:
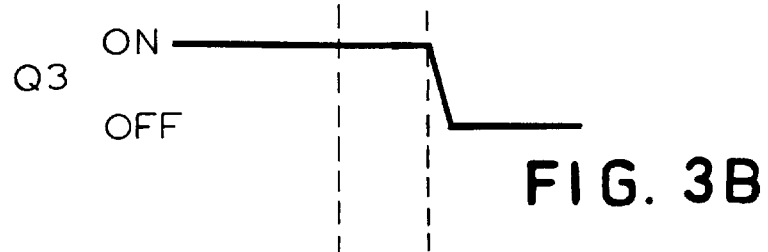
Figure 3C:
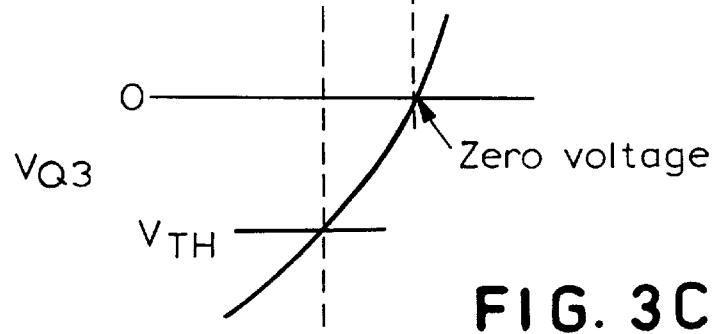
Figure 3D:
Figure 4A:
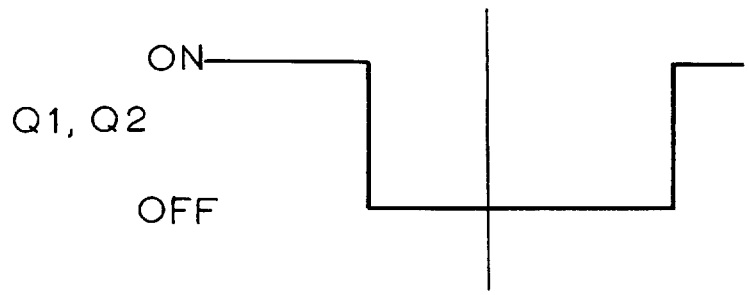
FIG. 4a illustrates a selected portion of the ON/OFF characteristic of the main power supply switches Q1, Q2 shown in FIG. 2.
Figure 4B:
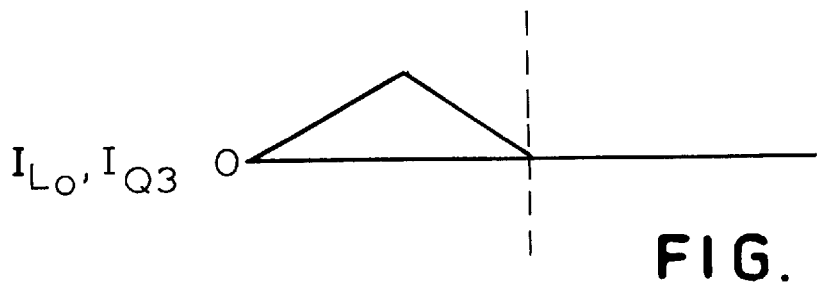
FIG. 4b illustrates a selected portion of the current characteristic of the converter output inductor current ($I_{LO}$) and the synchronous rectifier switch current ($I^{Q3}$) corresponding to the ON/OFF characteristics shown in FIG. 4a and FIG. 4c.
Figure 4C:
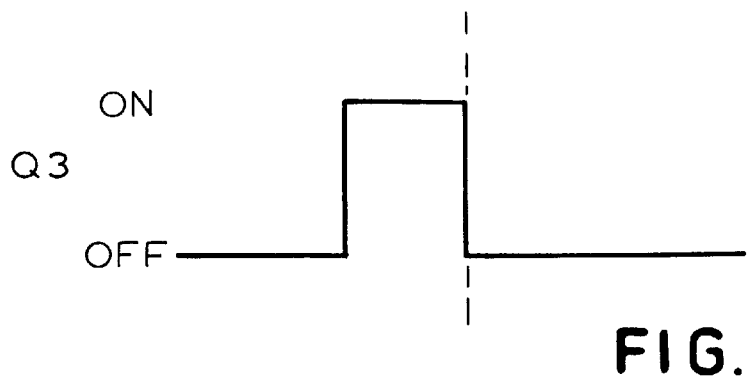
FIG. 4c illustrates a selected portion of the ON/OFF characteristic for the synchronous rectifier switch Q3 corresponding to the ON/OFF characteristic shown in FIG. 4a and the converter currents shown in FIG. 4b.
Figure 4D:
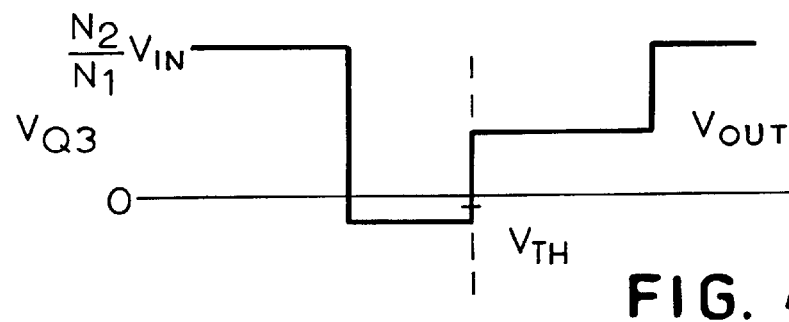
FIG. 4d illustrates a selected portion of the voltage characteristic ($V_{Q3}$) for the synchronous rectifier switch Q3 corresponding to the ON/OFF characteristics shown in FIG. 4a and FIG. 4c.

FIG. 2 is a detailed circuit diagram illustrating at 20' one example of the power converter 20 shown in FIG. 1 and embodying the present invention. The operation of the power converter 20' will be described herein by reference to the specific circuit elements shown in FIG. 2, along with the various graphs/diagrams shown in FIGS. 3a–d and 4a–d, wherein FIG. 3a illustrates a selected portion of the current characteristic for the synchronous rectifier switch Q3 shown in FIG. 2; FIG. 3b illustrates a selected portion of the ON/OFF characteristic for Q3 corresponding to the current characteristic shown in FIG. 3a; FIG. 3c illustrates a selected portion of the voltage characteristic for Q3 corresponding to the current characteristic shown in FIG. 3a; FIG. 3d illustrates a selected portion of the output characteristic of the logic element U4 shown in FIG. 2 and corresponding to the current characteristic shown in FIG. 3a; FIG. 4a illustrates a selected portion of the ON/OFF characteristic of the main power supply switches Q1, Q2 shown in FIG. 2; FIG. 4b illustrates a selected portion of the current characteristic of the converter output inductor current ($I_{Lo}$) and the synchronous rectifier switch current ($I_{Q3}$) corresponding to the ON/OFF characteristic shown in FIG. 4a; FIG. 4c illustrates a selected portion of the ON/OFF characteristic for the synchronous rectifier switch Q3 corresponding to the ON/OFF characteristics shown in FIGS. 4a and 4b; and FIG. 4d illustrates a selected portion of the voltage characteristic ($V_{Q3}$) for the synchronous rectifier switch Q3 corresponding to the ON/OFF characteristic shown in FIG. 4a.

The power converter 20' shown in FIG. 2 is a pulse width modulation (PWM) controlled forward converter having a PWM controller 26, an input inductor $L_i$, input capacitor $C_i$, transformer T1, reset winding catch diode CR1, main switch MOSFET Q1, synchronous rectifier MOSFETs Q2 and Q3, Schottky diode rectifier CR2, output Inductor $L_o$, output capacitor $C_o$, anti-simultaneous conduction logic U6 and U7 (prevents Q1 and Q2 from turning ON until Q3 is OFF as described in U.S. Pat. No. 5,479,089), MOSFET drivers U1, U2 and U3, and the control circuitry embodying the present invention (U4, U5, R1, R2, R3, R4, R5, CR3, CR4, CR4+n).

In operation, Q2 is switched ON and OFF simultaneously with Q1 (FIG. 4a). When the output signal, A, from the PWM controller 26 is high, U5 turns Q3 OFF first (FIG. 4c) then when U7 and U6 sense that Q3 is OFF and A is high, U6, U1, and U2 turn Q1 and Q2 ON. When A goes low, Q1 and Q2 turn OFF causing the voltage across $L_o$ to reverse direction (FIG. 4d), which causes the voltage across Q3 to drop below $V_{TH}$ which allows U4 to go low, U5 and U3 to go high and Q3 to turn ON (FIG. 4c).

The MOSFET Q3 is the synchronous rectifier that utilizes the control circuitry embodying the present invention. U4 is a comparator that measures the voltage across the drain-source of Q3 and commands Q3 OFF when this voltage is greater than the threshold voltage, $V_{TH}$, set by R2 and R4. In general $$V_{TH} = \frac{R2}{R2 + R4} V_-.$$

R2 and R4 are chosen such that the time it takes for the voltage across Q3 to drop from the voltage $V_{TH}$ to zero is the same as the delay time between when U4 commands Q3 OFF and when Q3 actually turns OFF (FIGS. 3a–3d). When the voltage across Q3 is zero, the current through Q3 and the output inductor, $L_o$, is also zero. This in effect allows the control circuit to be tuned to achieve zero voltage, zero current switching when Q3 turns OFF. R3 provides a small amount of positive feedback (hysteresis) across U4 to provide noise immunity.

CR3, CR4, CR4+n are used to "OR" in commands to turn Q3 OFF or to keep Q3 OFF. For example, when the power converter 20' itself is being internally or externally commanded ON or OFF, those ON and OFF commands are OR'd (U5) into the rectifier control circuitry (U4, U3) to prevent false operation when the converter housekeeping voltages $V_+$ or $V_-$ and/or the converter waveforms are unpredictable or irregular.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A synchronous rectifier circuit, comprising:
   a rectifier; and
   a rectifier control circuit that senses a voltage across said rectifier and turns said rectifier OFF when said rectifier voltage reaches a predetermined threshold value;

said predetermined threshold value having been selected such that it is predictive of a substantially zero current condition in the rectifier thereby preventing said rectifier from conducting current in more than one direction.

2. The synchronous rectifier circuit of claim 1, wherein said rectifier comprises a transistor and said rectifier control circuit comprises a logic circuit that provides a gating signal responsive to said sensed voltage so that said transistor is turned OFF when said sensed voltage crosses said predetermined threshold value.

3. The synchronous rectifier circuit of claim 1 wherein said predetermined threshold value comprises approximately zero volts.

4. An apparatus comprising:

a power source; and a power converter that receives power from said power source in a first format and converts said received power to a second format;

said power converter comprising a main switch, a synchronous rectifier, a main controller and a synchronous rectifier controller;

said main switch controlling said received power into said converter;

said synchronous rectifier adapted to conduct current in more than one direction when said synchronous rectifier is commanded ON and to conduct approximately zero current when said synchronous rectifier is commanded OFF;

said main controller controlling said main switch and said synchronous rectifier by switching said main switch and said synchronous rectifier in response to a first predetermined value associated with an output of said power converter;

said synchronous rectifier controller also controlling said synchronous rectifier and turning said synchronous rectifier OFF in response to a second predetermined value associated with a voltage across said synchronous rectifier wherein the second predetermined value is predictive of substantially zero current in the synchronous rectifier thereby preventing said rectifier from conducting current in more than one direction.

5. The apparatus of claim 4 wherein a satellite houses said power source and said power converter.

6. The apparatus of claim 4 wherein said synchronous rectifier controller senses said voltage across said synchronous rectifier.

7. The apparatus of claim 4 wherein said second predetermined value comprises approximately zero volts.

8. A method for controlling a synchronous rectifier, comprising the steps of:

sensing a voltage across a rectifier; and switching said rectifier OFF when said sensed voltage crosses a predetermined threshold value; said predetermined threshold value having been selected such that it is predictive of substantially zero current in the rectifier thereby preventing said rectifier from conducting current in more than one direction.

9. The method of claim 8 wherein said rectifier is capable of conducting current in more than one direction when said rectifier is ON.

10. The method of claim 8 wherein said predetermined threshold value comprises approximately zero volts.

11. In an apparatus having a power source and a power converter that converts power from said power source from one format to another format, a method comprising:

controlling a main switch and a synchronous rectifier, said main switch controlling the power received at said power converter, said synchronous rectifier conducting current in more than one direction when said synchronous rectifier is commanded ON and conducting approximately zero current when said synchronous rectifier is commanded OFF;

said step of controlling said main switch and said rectifier comprising switching said main switch and said rectifier in response to a first predetermined value associated with an output of the converter; and said step of controlling said synchronous rectifier further comprises turning said synchronous rectifier OFF in response to a second predetermined value associated with a voltage across said synchronous rectifier, wherein the second predetermined value is predictive of substantially zero current in the synchronous rectifier thereby preventing said rectifier from conducting current in more than one direction.

12. The method of claim 11 wherein said second predetermined value comprises approximately zero volts.

\* \* \* \* \*